US008259696B2

(12) United States Patent
Roberts

(10) Patent No.: US 8,259,696 B2
(45) Date of Patent: Sep. 4, 2012

(54) WIRELESS COMMUNICATION SYSTEM USING HARQ AND METHOD OF OPERATING THE SYSTEM

(75) Inventor: Keith Roberts, Cheddar (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 889 days.

(21) Appl. No.: 12/299,815

(22) PCT Filed: May 4, 2007

(86) PCT No.: PCT/IB2007/051678
§ 371 (c)(1),
(2), (4) Date: Nov. 6, 2008

(87) PCT Pub. No.: WO2007/129271
PCT Pub. Date: Nov. 15, 2007

(65) Prior Publication Data
US 2009/0180458 A1 Jul. 16, 2009

(30) Foreign Application Priority Data
May 10, 2006 (EP) .................................... 06113775

(51) Int. Cl.
*H04B 7/216* (2006.01)
*H04J 1/00* (2006.01)
*H04L 1/18* (2006.01)
*H04L 27/00* (2006.01)
*G06F 11/00* (2006.01)
*H04K 1/10* (2006.01)
*H03K 9/00* (2006.01)

(52) U.S. Cl. ........ 370/342; 370/343; 714/749; 714/799; 375/260; 375/295; 375/316

(58) Field of Classification Search ........................ None
See application file for complete search history.

(56) References Cited

U.S. PATENT DOCUMENTS
7,002,923 B2 * 2/2006 Golitschek et al. ........... 370/253
(Continued)

FOREIGN PATENT DOCUMENTS
EP    1172959 A2    1/2002
(Continued)

OTHER PUBLICATIONS

Yongzhong Zou et al: "A novel HARQ and AMC scheme using space-time block coding and turbo codes for wireless packet data transmission", Communication Technology Proceedings, 2003. ICCT 2003. International Conference on Apr. 9-11, 2003, Piscataway, NJ, USA,IEEE, vol. 2, Apr. 9, 2003, pp. 1046-1050, XP010644030 ISBN: 7-5635-0686-1.

(Continued)

*Primary Examiner* — Nittaya Juntima
(74) *Attorney, Agent, or Firm* — Larry Liberchuk

(57) ABSTRACT

A method of operating a wireless communications system, comprises encoding (12) information into a low rate code word, providing (20) at least two spatial sub-streams comprising different combinations of bits remaining after puncturing of the low rate code word, simultaneously transmitting (22) each of the at least two spatial sub-streams by way of a respective radio channel, receiving (24) the at least two spatial sub-streams, applying (28) a decoding process to the received at least two spatial sub-streams, and, if the decoding process is unsuccessful, transmitting simultaneously further spatial sub-streams comprising different combinations of bits remaining after puncturing of the low rate code word, at least one of the further spatial sub-streams being a not previously transmitted combination of bits remaining after puncturing of the low rate code word, receiving the further spatial sub-streams and applying the decoding process to the originally received at least two spatial sub-streams and the further sub-streams.

8 Claims, 2 Drawing Sheets

U.S. PATENT DOCUMENTS

| | | | |
|---|---|---|---|
| 2003/0072285 A1 | 4/2003 | Onggosanusi et al. | |
| 2004/0213184 A1 | 10/2004 | Hu et al. | |
| 2005/0149841 A1* | 7/2005 | Kyung et al. | 714/800 |
| 2007/0105508 A1* | 5/2007 | Tong et al. | 455/101 |

FOREIGN PATENT DOCUMENTS

| | | |
|---|---|---|
| EP | 1298829 A1 | 4/2003 |
| WO | 2005096531 A1 | 10/2005 |

OTHER PUBLICATIONS

Chung S. T. et al: "Approaching Eigenmode BLAST Channel Capacity Using V-BLAST With Rate and Power Feedback"; Proc. IEEE Vehicular Technology Conf. (VTC Fall 2001) vol. 2, pp. 915-919.

Wolniansky, P. W. et al: V-BLAST: An Architecture for Realizing Very High Data Rates Over Rich-Scattering Wireless Channel, Proc. ISSSE 98, PISA, Sep. 1998.

Foschini G. J.: D-BLAST Layered Space-Time Architecture for Wireless Communication in a Fading Environment When Using Multi-Antennas, Bell Labs Technical Journal, pp. 41-59, Autumn 1996.

Lucent: Increasing MIMO Throughput with Per-Antenna Rate Control, TSG-R1-(01)-0879, 3GPP TSG RAN WG1, 2002.

Ericsson: Selective Per-Antenna Rate Control (S-PARC), 3 GPP TSG RAN WG1 #36, R1-04-0307, Malaga, Spain, Feb. 16-20, 2004.

Alexiou et al: "Assessment of Advanced Beamforming and MIMO Technologies", D2.7 Version 1.0, Feb. 28, 2005, IST-2003-507581 Winner, Information Society Technologies.

Philips: "Spatial Channel Coding (SCC) for High Throughput With a Single Receive Antenna", 3 GPP TSG RAN WG1 Meeting #38, Prague, Czech Republic, Aug. 16-20, 2004.

Tarokh V. et al: Space-Time Codes for High Data Rate Wireless Communication: Performance Criterion and Code Construction; IEEE Transactions on Information Theory, vol. 44, No. 2, Mar. 1998.

* cited by examiner

WIRELESS COMMUNICATION SYSTEM USING HARQ AND METHOD OF OPERATING THE SYSTEM

FIELD OF THE INVENTION

The present invention relates to a wireless communication system using HARQ (Hybrid Automatic Repeat Request), for example a MIMO (Multiple Input Multiple Output) system, and to a method of operating the system.

BACKGROUND OF THE INVENTION

Many existing and proposed future wireless communication systems typically employ ARQ (Automatic Repeat Request) to repeat the transmission of data packets that were received in error. If a data packet is received correctly, a receiver transmits back an ACKnowledgement message (ACK) to a transmitter which proceeds by transmitting a new data packet. However if a data packet is received incorrectly, the receiver transmits a Negative ACKnowledgement (NACK) message. In response to receiving a NACK, the transmitter retransmits the same data packet a number of times until it receives an ACK. The maximum number of retransmissions of a data packet can be defined by the wireless communications system. A drawback of all ARQ systems is that they insert latency as there may be a considerable delay incurred due to the receiver having to signal "NACKs" and then wait for and decode multiple retransmissions of the same packet. Such delays can be particularly serious if retransmission is handled in higher layers.

Hybrid Automatic Repeat Request (HARQ) techniques have been applied to wireless communication systems to improve their performance and efficiency. In a HARQ system, a FEC (Forward Error Correction) code word is sent with each transmission and is used to determine if the packet has been received correctly. If a data packet is received correctly, an ACK is sent by the receiver thereby enabling the transmitter to transmit the next packet. However a NACK is issued in the event of the packet being received incorrectly. In response to the NACK, the transmitter resends the packet with a different part of the FEC code word and the receiver collects the received coded bits from all transmissions of the same packet before attempting decoding.

In order to increase the capacity of wireless communication systems, many wireless communication systems now use multiple antenna systems to transmit and/or receive information. The capacity of a system is the total amount of information conveyed by the communications system over a defined period of time. MIMO antenna systems are now proposed because they enable different information to be transmitted and to be received simultaneously. Integrating typical MIMO techniques with HARQ in an optimal way is not straightforward. This is illustrated in the following two examples.

In a first example Spatial multiplexing schemes, for example V-BLAST (for reference see Chung S. T., Lozano A., Huang H. C., "Approaching Eigenmode BLAST Channel Capacity Using V-BLAST with Rate and Power Feedback", in Proc. IEEE Vehicular Technology Conf. (VTC Fall 2001) vol. 2, pp. 915-919, Atlantic City, N.J., October 2001, and Wolniansky P. W., Foschini G. J., Golden G. D., Lavenzuela R. A., "V-BLAST: An Architecture for Realising Very High Data Rates Over the Rich-Scattering Wireless Channel", Proc. ISSSE 98, Pisa, September 1998); D-BLAST (for reference see Forschini G. J., "Layered Space-Time Architecture for Wireless Communication in a Fading Environment when using Multi-Antennas" Bell Labs Tech. J., pp 41-59, Autumn 1996); and PARC (for reference see Lucent, TSG-R1-01-0879, "Increasing MIMO Throughput with Per-Antenna Rate Control," 3*GPP TSG RAN WG1 Document*, available through ftp://ftp.3gpp.org/, 2002; and Ericsson, "Selective Per Antenna rate Control (S-PARC), 3 GPP TSG RAN WG1, R1-04-0307), or closed-loop schemes (for reference see IST-2003-507581 WINNER, "Assessment of Advanced Beamforming and MIMO Technologies" D2.7, February 2005), use multiple transmit antennas to transmit a number of streams of data ("spatial sub-streams") simultaneously via the same frequency channel. Typically these sub-streams are coded independently of each other, which allows rate adaptation of the sub-streams to the current channel conditions (as in for example PARC). Typically, if an error is detected in any one sub-stream then a retransmission will be requested for all sub streams. This is because the receiver possesses a combination of the sub-streams that it must attempt to separate, and errors in decoding one sub-stream will tend to coincide with errors in the other sub-streams.

In a second example some MIMO schemes split a code word across multiple antennas for transmission. Such schemes include "Spatial Channel Coding" (for reference see Philips, TSG-RAN1-04-0920, "Spatial Channel Coding for High Throughput With a Single Receive Antenna", 3*GPP TSG RAN WG1 Document*, available through ftp://ftp.3gpp.org/, 2004), and space-time trellis coding (for reference see Tarokh V., Seshadri N., Calderbank A. R., "Space-Time Codes for High Data rate Wireless Communication: Performance Criterion and Code Construction2, IEEE Transactions on Information Theory, Vol. 44, No. 2, March 1998). Transmit diversity schemes (for example space-time block codes) can also be placed in this class by considering the diversity transmission to be a simple form of coding across antennas (the simplest approach being repetition coding). In such schemes ARQ can be straightforwardly applied by repeating unsuccessfully decoded code words. However application of HARQ-type II basically requires a further layer of coding, such that the "data" bits input to the spatial code across antennas are in fact the bits remaining after puncturing a low-rate HARQ code word. It should also be noted that, although potentially offering good performance, schemes that code across antennas are typically inflexible (the code is designed for a specific transmission rate and number of antennas) and may require high complexity decoding at the mobile terminal.

US Published Patent Specification 2004/0213184 A1 discloses that increased complexity can be avoided when a HARQ process is created for all the antennas. One coding process, that is, a single FEC coder is used across all the antennas and hence only a single block code will be generated for the antennas. Original information to be transmitted is coded by the channel coder, which operates at a fixed code rate and becomes coded information, referred to as a coded block. The coded block is then distributed as packets by a distribution unit among the plurality of antennas based on channel information received by a distribution unit and then rate matched and modulated before transmission.

The groups of coded sub-blocks are thus transmitted through one or more of the antennas. During subsequent retransmissions, the same coded block from the first transmission will be used and the number of sub-blocks in each group for each antenna will be re-calculated based on the channel condition of the antenna during the time of retransmission. Subsequently, the sub-blocks of each group are again rate matched and modulated to meet the current channel condition of the antenna through which the sub-blocks group are to be transmitted. The distribution unit retransmits previously transmitted information when a NACK is received but with newly selected number of sub-blocks in each antenna based on the current channel conditions of the antenna.

EP 1 298 829-A1 discloses HARQ techniques for multiple antenna systems in which at a transmitting station multiple error coded streams are formed from one block of information and transmitted by two or more antennas. Each error coded stream may be formatted according to the same protocol or different protocols, such as the Chase protocol and Incremental Redundancy (IR) protocol. If the information is not received correctly by a receiving station, a NACK is transmitted to the transmitting station. In response to receiving the NACK the multiple error coded streams are resent and at the receiving station the Chase protocol or IR protocol streams are combined with the previously sent streams. If a NACK is transmitted the process is repeated until either an ACK is transmitted or the process is timed-out and no more retransmissions of those multiple error coded streams are made. In the case of error coded streams formatted according to the IR protocol additional redundancy parity bits may be included in successive retransmissions.

US Published Patent Specification 2003/0072285 A1 discloses a HARQ technique using basis hopping for MIMO systems. The technique changes the basis (V) upon retransmission, which helps reduce the error probability upon retransmission. The idea behind changing the basis upon retransmission is the fact that the error rate performance of the MIMO scheme is affected by the choice of basis (V). When a packet is declared in error, choosing a different basis will likely reduce the error probability upon retransmission.

In order to minimise retransmission delays and thereby reduce latency, it is desirable that the probability of the first transmission failing is very low. This can be difficult to achieve in unfavourable propagation conditions or in radio links with limited ability to adapt their transmissions to the current channel characteristics.

SUMMARY OF THE INVENTION

An object of the present invention is to increase the probability of the first transmission in HARQ MIMO system succeeding.

A further object of the present invention is to provide flexibility in the HARQ transmission scheme such that it can be adapted to suit both changing channel conditions and data latency requirements.

According to a first aspect of the present invention there is provided a method of operating a wireless communications system, comprising encoding information into a low rate code word, providing at least two spatial sub-streams comprising different combinations of bits remaining after puncturing of the low rate code word, simultaneously transmitting each of the at least two spatial sub-streams by way of a respective radio channel, receiving the at least two spatial sub-streams, applying a decoding process to the received at least two spatial sub-streams, and, if the decoding process is unsuccessful, transmitting simultaneously further spatial sub-streams comprising different combinations of bits remaining after puncturing of the low rate code word, at least one of the further spatial sub-streams being a not previously transmitted combination of bits remaining after puncturing of the low rate code word, receiving the further spatial sub-streams and applying the decoding process to the originally received at least two spatial sub-streams and the further sub-streams.

In implementing the method in accordance with the present invention the quality of radio channels used for the transmission of the spatial sub-streams is monitored and the puncturing of the low rate code word is selected on the basis of the quality of the radio channels monitored.

The number of simultaneously employed spatial sub-streams may be selected on the basis of their respective channel qualities and/or data traffic requirements, such as throughput and/or delay.

The transmissions of the further spatial streams employing different numbers of spatial sub-streams and/or transmission rates to preceding transmissions may be derived from the same low rate codeword.

The further spatial sub-streams simultaneously may employ at least one spatial sub-stream for transmission of coded bits derived from the same low rate code word as a previous transmission and at least one spatial sub-stream for transmission of coded bits derived from a different input data stream or low rate code word.

The decoding process may be applied to a first spatial sub-stream of the received at least two spatial sub-streams, and, if unsuccessful, a second of the spatial sub-streams may be aggregated with the first spatial sub-stream to form a combination which is applied as a combination to the decoding process.

In a variant of the method in accordance with the present invention the decoding process is applied to simultaneously to all of the received at least two spatial sub-streams.

According to a second aspect of the present invention there is provided a wireless communications system comprising a primary station and at least one secondary station, the primary station including means for encoding information into a low rate code word, means for providing at least two spatial sub-streams comprising different combinations of bits remaining after puncturing of the low rate code word, means for simultaneously transmitting each of the at least two spatial sub-streams by way of a respective radio channel, and the secondary station including receiving means for receiving the at least two spatial sub-streams, decoding means for applying a decoding process to the received at least two spatial sub-streams, and means, responsive to the decoding process being unsuccessful, for causing the primary station to transmit simultaneously further spatial sub-streams comprising different combinations of bits remaining after puncturing of the low rate code word, at least one of the further spatial sub-streams being a not previously transmitted combination of bits remaining after puncturing of the low rate code word, and the receiving means in the secondary station receiving the further spatial sub-streams and the decoding means applying the decoding process to the originally received at least two spatial sub-streams and the further sub-streams.

According to a third aspect of the present invention there is provided a primary station for use in a wireless communications system comprising a primary station and at least one secondary station, the primary station including means for encoding information into a low rate code word, means for providing at least two spatial sub-streams comprising different combinations of bits remaining after puncturing of the low rate code word, means for simultaneously transmitting each of the at least two spatial sub-streams by way of a respective radio channel, and means responsive to a secondary station being unable to decode the low rate code word for transmitting simultaneously further spatial sub-streams comprising different combinations of bits remaining after puncturing of the low rate code word, at least one of the further spatial sub-streams being a not previously transmitted combination of bits remaining after puncturing of the low rate code word.

According to a fourth aspect of the present invention there is provided a secondary station for use in a wireless communications system comprising a primary station and at least one secondary station, the primary station including means for encoding information into a low rate code word, means for providing at least two spatial sub-streams comprising different combinations of bits remaining after puncturing of the low rate code word, and means for simultaneously transmitting each of the at least two spatial sub-streams by way of a respective radio channel, wherein the secondary station includes receiving means for receiving the at least two spatial sub-streams, decoding means for applying a decoding process to the received at least two spatial sub-streams, and means, responsive to the decoding process being unsuccessful, for causing the primary station to transmit simultaneously further spatial sub-streams comprising different combinations of bits remaining after puncturing of the low rate code word, at least one of the further spatial sub-streams being a not previously transmitted combination of bits remaining after puncturing of the low rate code word, and the receiving means in the secondary station receiving the further spatial sub-streams and the decoding means applying the decoding process to the originally received at least two spatial sub-streams and the further sub-streams.

The present invention has particular application to type-II HARQ schemes in which the first packet transmission consists of the information bits coded by a heavily punctured low rate code. In each subsequent retransmission different coded bits are sent corresponding to a different set of bits remaining after puncturing of a full low-rate code word. Effectively, at each retransmission the system switches to a lower rate code, hence automatically adjusting the system to the highest rate code that the receiver can correctly decode

BRIEF DESCRIPTION OF THE DRAWINGS

The present invention will now be described, by way of example, with reference to the accompanying drawings, wherein.

DETAILS OF THE INVENTION

Figure 1:
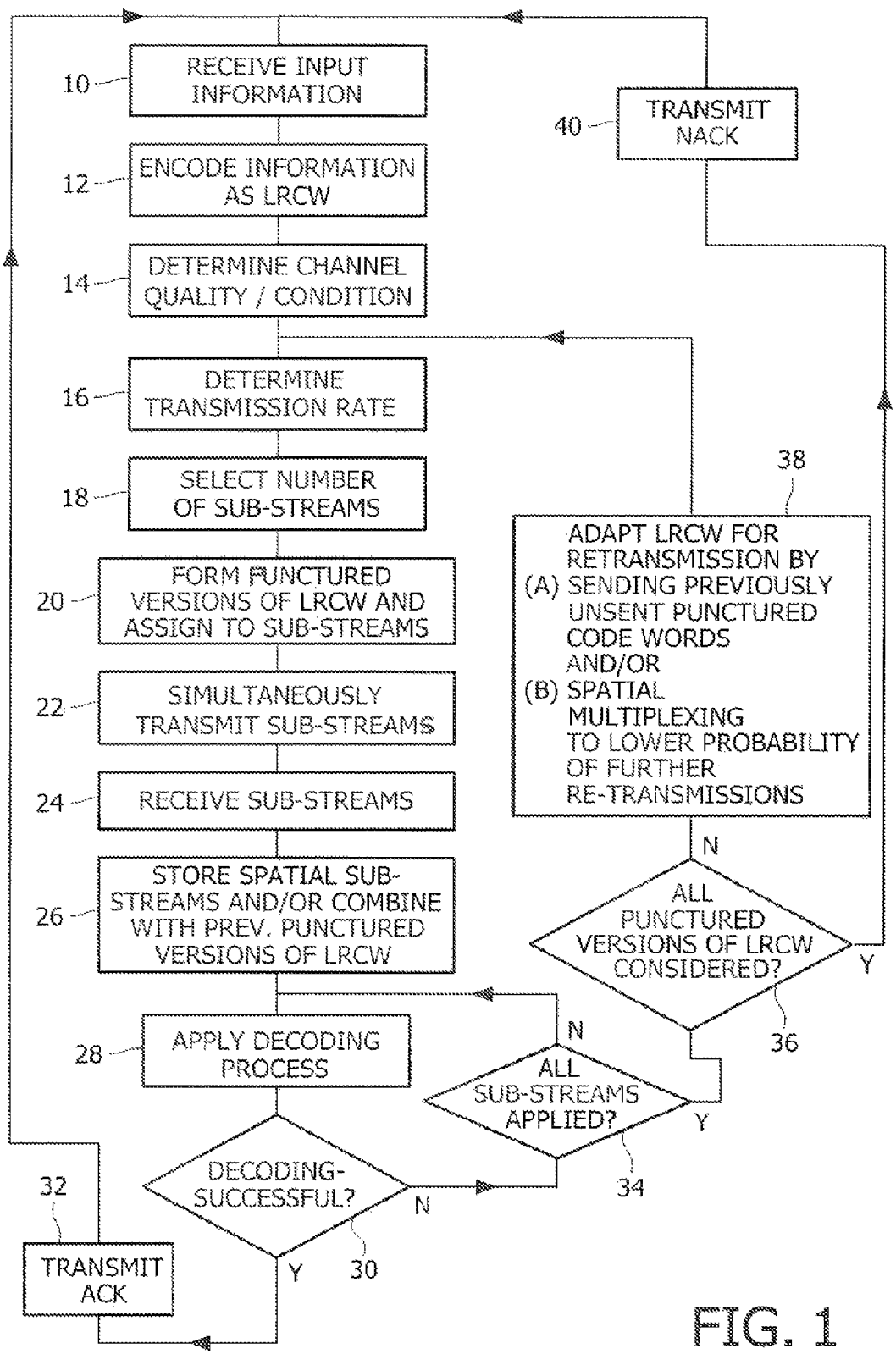
FIG. 1 is a flow chart illustrating an embodiment of the method in accordance with the present invention.

In the method in accordance with the present invention input information is encoded as a low rate code word (LRCW). Punctured versions of the LRCW, that is, the bits remaining after puncturing the LRCW, are selected depending on the qualities of the respective transmission channels and are transmitted simultaneously from a plurality of antennas as respective spatial sub-streams. At a receiving station, the respective signals are demodulated and stored. Several optional decoding strategies can be followed in order to recover the original LRCW. In a first strategy an attempt is made to decode bits in a first of the spatial sub-streams, if this is successful then the receiver sends an ACK and new information is transmitted. However if this first decoding attempt is unsuccessful a second of the spatial sub-streams is combined with the first one and the additional coded bits facilitate the decoding process. If this second decoding attempt should fail then a third of the spatial sub-streams is combined with the first and the second spatial sub-streams and the decoding process is repeated. It is only after all the decoding attempts have failed or that the decoding process has timed-out that the receiving station transmits a NACK causing a spatial transmission of the previously unsent coded bits or the transmission of some new information and some previously sent information.

In alternative strategies, at least two, and perhaps all, the spatial sub-streams are combined at a time and an attempt is made to decode the combined signal.

Compared to the prior methods discussed in the preamble, the method in accordance with the present invention employs spatial multiplexing to transmit both bits normally transmitted as the first packet, for example by using one spatial sub-stream, and also coded bits normally sent in subsequent retransmissions, for example, by using further spatial sub-streams. The advantage of doing this is that the receiving station effectively has access to extra coded bits normally only available in retransmissions of the packet without the need for requesting retransmissions thereby reducing delays in packet reception. This allows the receiving station to decode selectively as few sub-streams as necessary to recover the data packet without error. This potentially provides battery life savings if, in good channel conditions, some decoding of the sub-streams is not required. In worse channel conditions all the sub-streams would need to be decoded and there would still be fewer retransmissions required than occurs in conventional HARQ systems. It is only if the packet is erroneous after decoding and combining the bits from all of the spatial sub-streams does the receiver signal that a retransmission is required.

In the following description of the drawings, the term "punctured code word(s) is intended to mean code word(s) comprising bits remaining after puncturing the LRCW and "punctured versions of the same LRCW" is intended to mean different versions of the same LRCW after puncturing of the LRCW.

Referring to the flow chart shown in FIG. 1, a block 10 indicates receiving input information. A block 12 indicates encoding the input information as a LRCW. A block 14 relates to an operation of determining the channel quality feedback or condition. Block 16 determining the transmission rate for each of the sub-streams having regard to the quality of the transmission channel. Block 18 relates to selecting the number p, where p is an integer which is less than or equal to the number of punctured code words, of sub-streams to be transmitted each time. The number p is selected contemporaneously depending on the channel qualities and/or data traffic requirements, such as throughput and/or delay of the respective channels. In practice there may be fewer sub-steams than the number n of antennas, where $n \geq p$, because for example some of the contemporaneously monitored radio channels are deemed to have such a poor quality that they cannot be used or some of the channels are being used for other purposes, such as spatial multiplexing of other input information streams. The number p may be chosen to be different in each re-transmission. Block 20 relates forming differentially punctured versions of the LRCW and assigning the appropriately punctured versions to respective sub-streams. The puncturing patterns employed are adapted according to channel quality feedback in order to vary the number of coded bits to be carried by each sub-stream. For example a good quality channel will have a punctured code word containing a greater number of coded bits compared to a poorer channel which will be assigned a punctured code word having fewer coded bits. Block 22 relates to simultaneously transmitting the sub-streams from respective ones of the antennas at a transmission rate determined for that channel. Block 24 relates to a receiving station receiving and demodulating the transmitted spatial sub-streams. Block 26 relates to storing the newly received spatial sub-streams together with any subsequently received spatial sub-streams containing punctured versions of the same LRCW. Block 28 relates to applying a decoding process to the received spatial sub-streams. As mentioned above, the decoding process may follow different strategies including progressively creating an aggregate of the sub-streams by, each time the decoding process fails, adding another or other sub-stream(s) to the sub-stream(s) or combination of sub-streams previously applied to the decoding process, or attempting to decode in a single process step a combination of all the sub-streams received at any one time. In the eventuality of having to transmit further sub-streams comprising punctured code words, at least one of which has not previously been transmitted, the decoding process considers these further sub-streams in combination with any previously received sub-streams. In block 30 a check is made to see if the decoding process is successful. If the decoding process has been successful, Y, then in block 32 an ACK is transmitted by the receiving station and the cycle is repeated. Alternatively if the decoding process has been unsuccessful, N, then in block 34 a check is made to see if all the sub-streams have been applied to the decoding process, block 28. If the answer is negative, N, the decoding process is repeated with another combination of sub-streams. However if the answer is positive, Y, then in block 36 a check is made if all the punctured versions of the LRCW have been considered. If the answer is negative, N, then in block 38 the receiving station signals to the transmitter that a retransmission is required. A retransmission is formed by for example sending sub-streams comprising previously unsent punctured versions of the LRCW, optionally together with some previously sent punctured versions. If the answer is positive, Y, in block 40 the receiving station transmits a NACK indicating that the transmission of the current information block has failed and the flow chart reverts to the block 10.

Although the invention has been described with reference to the flow chart of FIG. 1 in which each spatial sub-stream is mapped to a single distinct transmit antenna, it will be apparent to those skilled in the art that the block 22 may also include an operation of beam forming or pre-coding in which sub-streams are mapped with different weightings to a plurality of transmit antennas.

Figure 2:
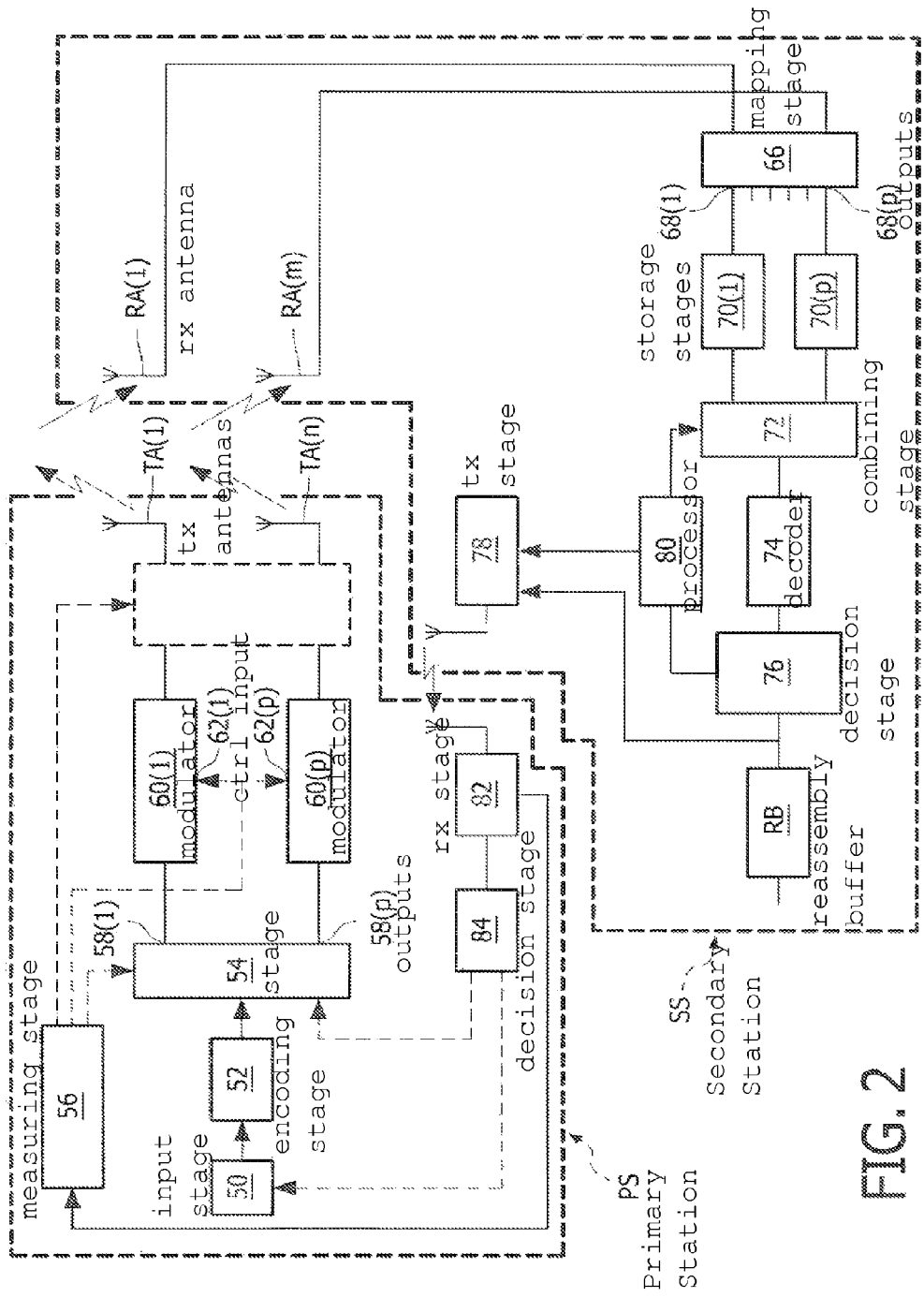
FIG. 2 is a block schematic diagram of a MIMO wireless communications system using HARQ.

Referring to FIG. 2, the system in accordance with the present invention comprises a primary station PS and a plurality of secondary or receiving stations SS only one of which is shown. The secondary stations SS may be mobile and capable of roaming or fixed. For convenience of illustration and to facilitate comprehension, the primary station PS and the secondary station SS have been shown as comprising a plurality of blocks, however it is to be understood that the functions of at least some of these blocks can be implemented in software on a processor.

In summary, input information to the primary station PS is encoded and transmitted as a plurality of spatial sub-streams from respective transmitter antennas TA(1) to TA(n), where n is an integer. The spatial sub-streams are received by receiver antennas RA(1) to RA(m), where m is an integer typically $\geq$n, and are applied to a decoding process. If the decoding process is successful then the transmitted information is recovered and re-assembled in a re-assembly buffer RB and an ACK is transmitted to the primary station PS. Alternatively if the decoding process is unsuccessful then a NACK is transmitted to the primary station PS and, if appropriate, additional encoded sub-streams are transmitted. Transmissions from the secondary station SS to the primary station PS may also provide information about the quality or condition of the respective wireless channels between respective pairs of the transmitter and receiver antennas TA(1) to TA(n) and RA(1) to RA(m).

The primary station PS comprises an input stage 50 for receiving input information to be transmitted. An output of the input stage 50 is coupled to an encoding stage 52 which encodes the input information as a low rate code word (LRCW). The encoding stage is coupled to a stage 54 which produces punctured versions of the LRCW. A channel quality measuring stage 56 provides an output which is applied to the stage 54. The stage 54 may be implemented in several ways, for example as a processor for implementing a puncturing algorithm in response to a channel quality indication provided by the channel quality measuring stage 56 or as a read-only memory (ROM) storing puncturing patterns, one of which is selected in response to an output from the stage 56. A plurality p of sub-streams consisting of punctured patterns are applied to respective outputs 58(1) to 58(p) of the stage 54. A modulator 60(1) to 60(p) is coupled to each of the outputs 58(1) to 58(p). Each of the modulators has a control input 62(1) to 62(p) to receive a select modulation signal from the channel quality measuring stage 56. Each of the modulators 60(1) to 60(p) is coupled to a respective one of the transmitter antennas TA1 to TA(n). There may be a one-to-one correspondence between the modulators and the transmitter antennas, that is p=n. However there may be more transmitter antennas TA(1) to TA(n) than modulators, that is n>p, in which a case MIMO stage 64 may be provided to effect beam-forming or pre-coding in response to control signals from the stage 56. Those of the transmitter antennas TA(1) to TA(n) which are not coupled to the modulators 60(1) to 60(p) may be in use for other purposes such as spatial multiplexing of other input information streams or may be unused because the quality of the radio channel is unsatisfactory due to temporary propagation difficulties resulting from the presence of topographical features such as tall buildings or hills.

The spatial sub-streams received by the secondary station SS on the receiving antennas RA(1) to RA(m) are relayed to a MIMO de-mapping stage 66 which has outputs 68(1) to 68(p) for the received sub-streams. Demodulator and storage stages 70(1) to 70(p) are coupled to the respective outputs 68(1) to 68(p) of the mapping stage 66. A combining stage 72 has inputs coupled to outputs of the stages 70(1) to 70(p). The combining stage 72 is controlled in response to the decoding strategy currently being followed to select one or more, and perhaps all, of the modulator outputs and supply them to a decoder 74. A decoder decision stage 76 is coupled to an output of the decoder 74.

If the current LRCW has been decoded successfully it is passed to the re-assembly buffer RB and an ACK signal is passed to a transmitter stage 78 whereby it is relayed by an upstream radio channel to a receiver stage 82 in the primary station PS. A decision stage 84 coupled to the receiver stage 82 responds to the receipt of the ACK signal by instructing the input stage 50 to transmit more information to the LRCW encoding stage 52.

If the LRCW has not been decoded successfully, the decoder decision stage 76 issues a negative output which is sent to a processor 80. The processor 80 sends a control signal to the combining stage 72 instructing it to send another combination of received sub-streams to the decoder 74. In the event of all the combinations of the received sub-streams having been exhausted without the LRCW having been decoded successfully, the processor 80 causes a first type of NACK signal to be transmitted to the primary station PS. The decision stage 84 in response to this first type of NACK signal causes the stage 54 to send more punctured versions of the LRCW to be transmitted. At the secondary station SS the new punctured versions of the LRCW are combined in the combining stage 72 with the previously sent punctured codes. The new punctured versions of the LRCW may include previously coded bits or comprise entirely of not previously sent coded bits. The new punctured versions of the LRCW may be sent at different transmission rates utilising a different number of sub-streams to the number of previously transmitted sub-streams according to the current channel conditions as indicated by channel quality measuring stage 56, that is the number may have a different value. The decoding operation is repeated with new combinations of sub-streams.

In the event of the LRCW not being decoded and all the punctured versions of the LRCW having been transmitted to the secondary station SS, the processor sends a second type of NACK which causes the decision stage 84 to instruct the input stage 50 that transmission of the current information block failed.

In variants of the described embodiment of the method in accordance with the present invention it is possible to achieve great flexibility to adapt the multiple antenna transmissions according to either or both of the channel conditions and the traffic delay requirements. This is achieved by flexibly using some of the available spatial sub-streams to carry extra information (standard spatial multiplexing) for high throughput in suitably good channel conditions, and some of the available sub-streams to send additional coded bits belonging to these information streams for reduced latency through fewer retransmissions. The balance between the number of sub-streams used for each purpose can be varied according to the channel conditions and traffic delay requirements thereby giving a very flexible transmission scheme.

Using multiple sub-streams to carry extra redundancy information, that is, coded bits normally sent in retransmissions, can achieve some of the performance improvement of other schemes that utilise multiple transmit antennas to provide redundancy, for example, transmit diversity, space-time codes. However, whereas the method in accordance with the present invention provides the flexibility described above, the known schemes are typically inflexible because the code is designed for a specific transmission rate and number of antennas.

The method in accordance with the present invention offers further flexibility to adapt to channel conditions by varying the transmission rates of the sub-streams. A low rate code word is punctured to form punctured code words to be transmitted in different spatial sub-streams and any retransmissions. The puncturing patterns employed can be adapted according to channel quality feedback in order to vary the number of coded bits carried by each sub-stream. This allows different transmission rates (including different modulation orders) to be employed in different spatial sub-streams according to the current channel conditions.

Retransmissions may comprise entirely of previously unsent coded bits or alternatively re-send some of the previously multiplexed bits.

Although not all channels support significant additional capacity in spatially multiplexed sub-channels, even in the case that just a few extra coded bits may be sent in a second sub-channel this will still reduce the probability of a retransmission being required, and even a small reduction in this probability can result in a large reduction in latency if it prevents a retransmission.

It is within the scope of the present invention that the punctured code words and the punctured versions of the LRCW comprises bits punctured out of the LRCW as opposed to those bits which are left after puncturing the LRCW. Accordingly in the claims the phrase "bits remaining after puncturing of the low rate code word" should be construed as covering either or both forms of puncturing.

In the present specification and claims the word "a" or "an" preceding an element does not exclude the presence of a plurality of such elements. Further, the word "comprising" does not exclude the presence of other elements or steps than those listed.

The use of any reference signs placed between parentheses in the claims shall not be construed as limiting the scope of the claims.

From reading the present disclosure, other modifications will be apparent to persons skilled in the art. Such modifications may involve other features which are already known in the design, manufacture and use of communication systems and component parts therefor and which may be used instead of or in addition to features already described herein.

The invention claimed is:

1. A method of operating a wireless communications system comprising:
   encoding information into a low rate code word,
   providing at least two spatial sub-streams, each spatial sub-stream comprising a different combination of bits remaining after puncturing of the low rate code word,
   simultaneously transmitting each of the at least two spatial sub-streams by way of a respective radio channel,
   receiving the at least two spatial sub-streams,
   applying a decoding process to the received at least two spatial sub-streams by aggregating, in response to an unsuccessful decoding process in the decoding process for a first spatial sub-stream of the received at least two spatial sub-streams, a second of the spatial sub-streams with the first spatial sub-stream to form a combination and said applying further including applying the decoding process to the combination, and, transmitting a negative acknowledgement responsive to an unsuccessful decoding process of the at least two spatial sub-streams,
   transmitting simultaneously further spatial sub-streams responsive to the negative acknowledgement, each further spatial sub-stream comprising a different combination of bits remaining after puncturing of the low rate code word, at least one of the further spatial sub-streams being a not previously transmitted combination of bits remaining after puncturing of the low rate code word,
   receiving the further spatial sub-streams, and
   applying the decoding process to the originally received at least two spatial sub-streams and the further sub-streams.

2. The method of claim 1, further comprising:
   monitoring the quality of radio channels used for the transmission of the spatial sub-streams and
   selecting the puncturing of the low rate code word on the basis of the quality of the radio channels monitored.

3. The method of claim 1, further comprising:
   selecting a number of simultaneously employed spatial sub-streams on the basis of their respective channel qualities and/or data traffic requirements.

4. The method of claim 3, wherein the data traffic requirements comprise throughput or delay.

5. The method of claim 1, wherein the transmissions of the further spatial sub-streams employ different numbers of spatial sub-streams or transmission rates to preceding transmissions derived from the same low rate codeword.

6. The method of claim 1, wherein the further spatial sub-streams simultaneously employ at least one spatial sub-stream for transmission of coded bits derived from the same low rate code word as a previous transmission and at least one spatial sub-stream for transmission of coded bits derived from a different input data stream or low rate code word.

7. A wireless communications system comprising:
a primary station and at least one secondary station, the primary station including
   means for encoding information into a low rate code word,
   means for providing at least two spatial sub-streams, each spatial sub-stream
comprising a different combination of bits remaining after puncturing of the low rate code word,
   means for simultaneously transmitting each of the at least two spatial sub-streams by way of a respective radio channel,
and the secondary station including
   receiving means for receiving the at least two spatial sub-streams,
   decoding means for applying a decoding process to the received at least two spatial sub-streams,
   means, responsive to an unsuccessful decoding in the decoding process for a first spatial sub-stream of the received at least two spatial sub-streams, for aggregating a second of the spatial sub-streams with the first spatial sub-stream to form a combination and wherein said decoding means applies the decoding process to the combination,
   means for transmitting a negative acknowledgement, and
   means for causing the primary station to transmit simultaneously further spatial sub-streams responsive to the negative acknowledgement, each further spatial sub-stream comprising a different combination of bits remaining after puncturing of the low rate code word, at least one of the further spatial sub-streams being a not previously transmitted combination of bits remaining after puncturing of the low rate code word, and
   the receiving means in the secondary station receiving the further spatial sub-streams and the decoding means applying the decoding process to the originally received at least two spatial sub-streams and the further spatial sub-streams.

8. The system of claim 7, further comprising:
means for monitoring the quality of radio channels used for the transmission of the spatial sub-streams and for providing a control signal for selecting the puncturing of the low rate code word on the basis of the quality of the radio channels monitored.

* * * * *